(No Model.)
B. P. SAUNDERS.
CULVERT.
No. 542,978. Patented July 16, 1895.
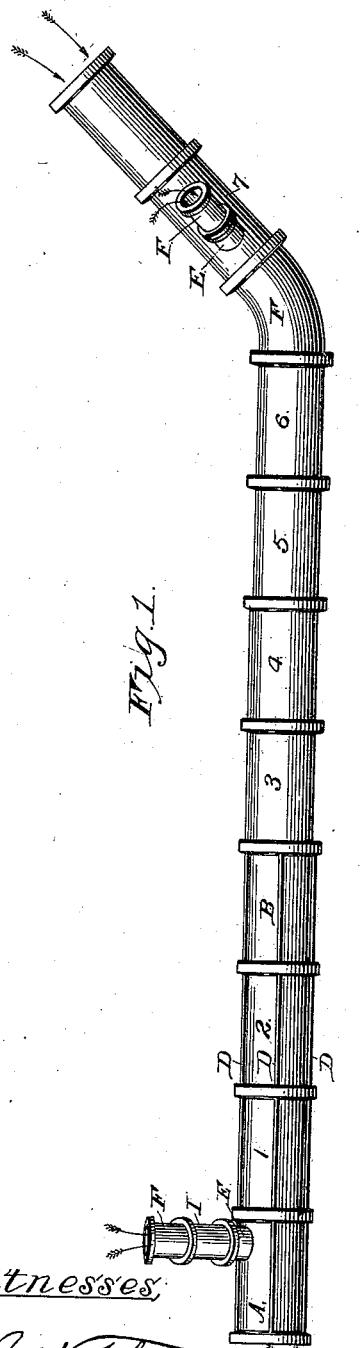
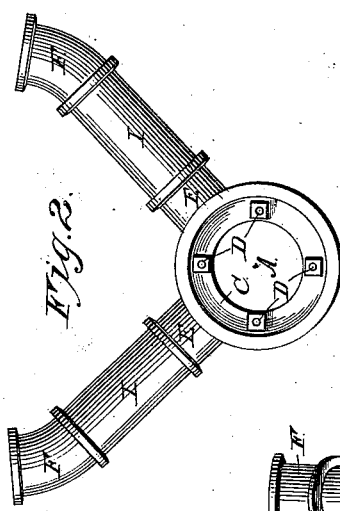
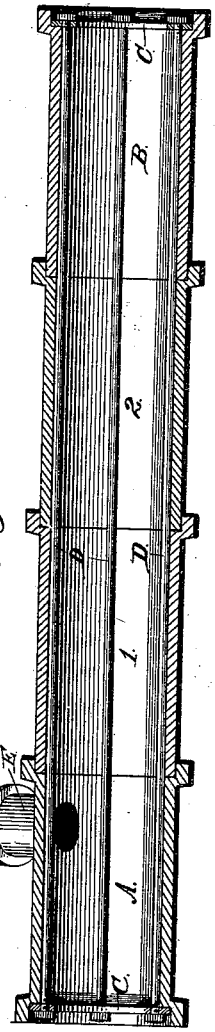
Witnesses:
Inventor:
Benj. P. Saunders,
By Hipson & Hipson
Atty's.

UNITED STATES PATENT OFFICE.

BENJAMIN P. SAUNDERS, OF DYE, MISSOURI.

CULVERT.

SPECIFICATION forming part of Letters Patent No. 542,978, dated July 16, 1895.

Application filed February 23, 1895. Serial No. 539,519. (No model.)

*To all whom it may concern:*

Be it known that I, BENJAMIN P. SAUNDERS, a citizen of the United States, residing in Dye, in the county of Platte, State of Missouri, have invented a new and useful Improvement in Culverts, of which the following, taken in connection with the accompanying drawings, is a full, clear, and exact specification.

My invention relates to culverts; and my object is to provide a cheap and reliable drainage apparatus composed of a number of tubular sections or pipes which are detachably secured or tied together to prevent them washing apart or giving way under the action of water, and thus may be employed in various connections and places, because the culvert may be quickly and easily lengthened or shortened, as occasion may demand.

With this object in view the invention consists in certain peculiar and novel features of construction and combinations of parts, as will be hereinafter described and claimed.

In order that the invention may be fully understood, I will proceed to describe it with reference to the drawings, in which—

Figure 1 is a side elevation of a culvert constructed in accordance with my invention. Fig. 2 is an end view of a culvert constructed in accordance with my invention. Fig. 3 is a longitudinal section to show more clearly the internal arrangement of the tie-rods.

In the said drawings, Figs. 2 and 3 represent sections which are coupled endwise together to form a single culvert structure adapted to extend clear across the road to be drained, and to be planted or buried about three feet below the surface or a sufficient distance below to remove all danger of breakage or injury by passing vehicles. The material used is preferably sewer-piping.

Referring now to the structure specifically, A designates a pipe, which is provided with a flange at each end, and communicating with this pipe is one or more branch pipes or arms E. This pipe forms, preferably, the discharge end of the culvert, and with about six or eight additional feet of pipe, consisting of, say, pipes 1, 2, and B, all single-flange pipes 1 fitting in one end of pipe A. A pipe 2, in flange of pipe 1, and B, in flange of pipe 2, form the foundation to prevent the disintegration of the whole structure by being clamped firmly together by means of a series of tie-rods D. Said rods may be either external of said pipes and thereby extend through registering apertures in the flanges and be engaged by retaining-nuts at their ends, as shown in Fig. 1, to clamp the sections firmly together, or may be internally arranged with reference to said pipes and have their ends projecting through rings C and engaged by nuts which clamp the rings firmly against the shoulder of the pipe B and against the shoulder of pipe A at the discharge end of the same. Sufficient one-flange pipes to cross the road are now fitted together and to the pipes first described, pipe 3 fitting in pipe B, pipe 4 in pipe 3, pipe 5 in pipe 4, and pipe 6 in pipe 5. A single-flange elbow-pipe F is then fitted in pipe 6, and a single-flange pipe 7 fitted in the flanged end of pipe F and extends upwardly, and continuing the direction of pipe 7 are one or more single-flange pipes, the upper end of which comes preferably to the surface of the ground contiguous to the roadside and is adapted to receive, as a mouth, water draining from the road.

In order to make a more reliable connection the pipes are cemented together at their junction points—the pipes A, 1, 2, and B, as well as the others not tied by rods—and it will be apparent, owing to the fact that the culvert is arranged to slope gradually down to its discharge end, that it cannot disintegrate by the separation of any of its pipes by the action of water, because the foundation portion of the culvert—namely, the pipes at the discharge end—are tied together and planted firmly in position.

In order to carry off the water at the opposite side of the roadway, a pipe F or pipes 1 and F are fitted and cemented to the pipe E to form a branch or arm of the culvert which leads to the surface of the road. The number of branch conduits, of course, will correspond to the number of branches or pipes E, hereinbefore referred to, of pipe A.

From the above description, taken in connection with the drawings, it will be understood that I have produced a culvert of cheap, strong, and durable construction, which may be constructed and laid by unskilled persons, and which, while practically beyond injury, may easily and quickly be repaired, if necessary.

Having thus described the invention, what I claim, and desire to secure by Letters Patent, is—

1. A culvert, comprising a double-flanged pipe, and a number of single-flanged pipes, the unflanged ends of all but one of which fit in the flanged ends of the others, and the remaining one having its unflanged end fitting in one of the flanged ends of the double-flange pipe, substantially as set forth.

2. A culvert, comprising a double-flanged pipe, provided with a branch pipe or arm composed of any desirable number of sections, and a number of single-flange pipes, the unflanged ends of all but one of which fit in the flanged ends of the others, and the remaining one having its unflanged end fitting in one of the flanged ends of the double-flange pipe, substantially as set forth.

BENJ. P. SAUNDERS.

Witnesses:
ROBERT MURDOCK,
CHAS. H. HILLIX.